United States Patent
Peng et al.

(10) Patent No.: US 9,933,057 B1
(45) Date of Patent: Apr. 3, 2018

(54) LINEAR ACTUATOR WITH A MODULAR SUPPORT DEVICE

(71) Applicant: HIWIN TECHNOLOGIES CORP., Taichung (TW)

(72) Inventors: Tsung-Wen Peng, Taichung (TW); Meng-Lung Tsai, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 15/450,922

(22) Filed: Mar. 6, 2017

(51) Int. Cl.
*F16H 25/20* (2006.01)
*F16H 25/24* (2006.01)
*F16H 19/06* (2006.01)
*F16H 19/00* (2006.01)

(52) U.S. Cl.
CPC .......... *F16H 25/20* (2013.01); *F16H 19/003* (2013.01); *F16H 19/06* (2013.01); *F16H 19/0672* (2013.01); *F16H 2019/0668* (2013.01); *F16H 2025/204* (2013.01); *F16H 2025/2096* (2013.01); *F16H 2025/2436* (2013.01)

(58) Field of Classification Search
CPC ....... F16H 2025/2096; F16H 2025/204; F16H 19/003; F16H 19/06; F16H 2019/0668; F16H 19/0672
USPC ................... 74/89.22–89.33, 89.36
See application file for complete search history.

(56) References Cited

U.S. PATENT DOCUMENTS 5,720,202 A   2/1998   Senjo et al.
9,285,021 B2 * 3/2016   Chen ........................ F16H 25/20
9,752,664 B2 * 9/2017   Kawauchi ............... F16H 25/24

FOREIGN PATENT DOCUMENTS

TW          I 524018 B    3/2016

* cited by examiner

*Primary Examiner* — William C Joyce
*Assistant Examiner* — Randell J Krug
(74) *Attorney, Agent, or Firm* — Muncy, Geissler, Olds & Lowe, P.C.

(57) ABSTRACT

A linear actuator includes a linear module including a base, a screw rod mounted in the base and a transmission carriage threaded onto the screw rod, and a support module including two support carriages movably mounted on the screw rod at two opposite sides relative to the transmission carriage, a protective cover disposed at one side of the base and connected to the two support carriages, two pulley blocks mounted at the two opposite ends of the protective cover and a cable wound round the pulleys of the pulley blocks and connected to the transmission carriage and the base by a respective cable connection plate. Thus, the transmission carriage utilizes the cable to carry one pulley block and then the protective cover, causing the protective cover to carry the two support carriages and the other pulley block, achieving the effect of supporting the screw rod.

6 Claims, 5 Drawing Sheets

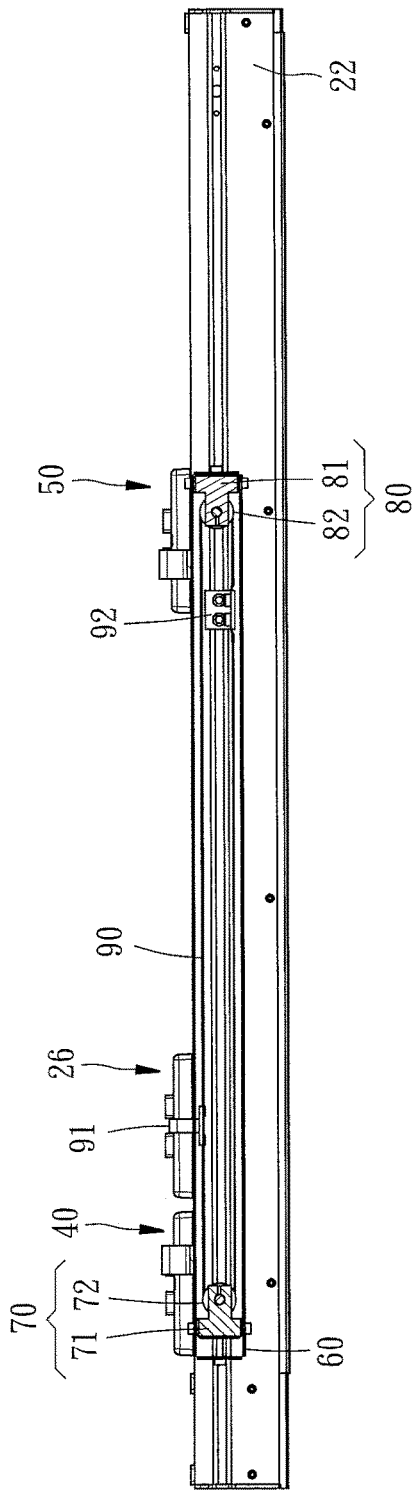
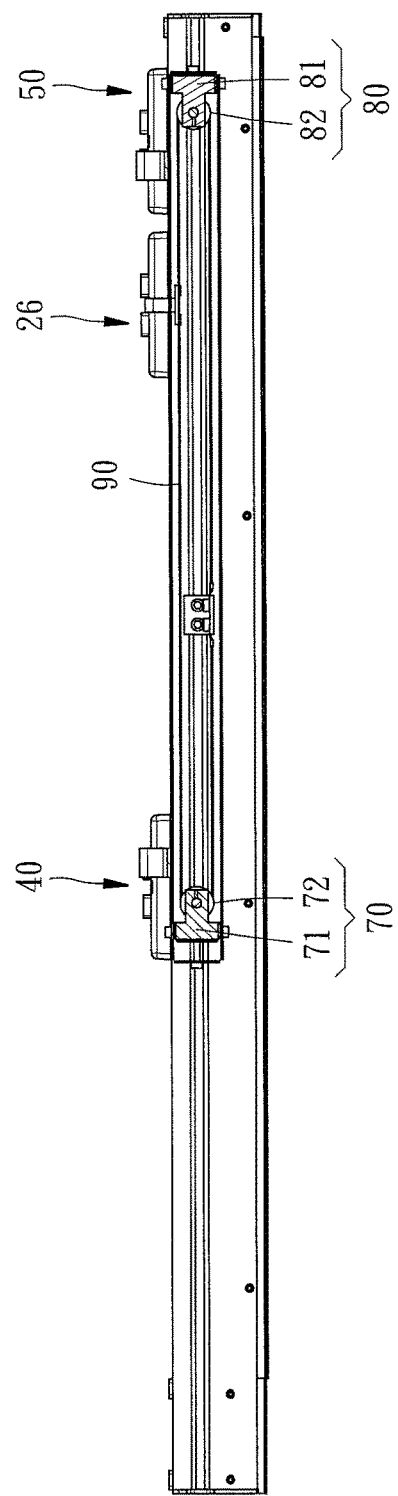

LINEAR ACTUATOR WITH A MODULAR SUPPORT DEVICE

BACKGROUND OF THE INVENTION

1. Field of the Invention

The present invention relates to linear actuator technology and more particularly, to a linear actuator with a modular support device.

2. Description of the Related Art

Generally speaking, linear actuators (such as ball screws) have been extensively used for transmissions where precision is of high priority, and the length of the screw of a ball screw is increased with the travel of the transmission. However, a long screw with a large slenderness ratio tends to have gravity sag due to its own weight. Such sag can significantly degrade the precision of the transmission, and has adversely effect on the service life of the screw. In order to solve this problem, U.S. Pat. No. 5,720,202 discloses a ball screw actuator, which utilizes support members and pulleys to support the screw. Further, Taiwan Patent Publication No. 1524018 teaches the utilization of deceleration principle of cone pulley to achieve the effect of supporting the screw. However, in the aforesaid prior art designs, the pulleys and support members and the cone pulleys require much installation space. Therefore, these prior art designs are not practical for the implementation of small size linear actuators. Further, the large amount of component parts of these prior art designs make the linear actuators complicated in structure, complicating the installation. Further, adjustment of the tension of the belts is another problem to be solved.

SUMMARY OF THE INVENTION

The present invention has been accomplished under the circumstances in view. It is the main object of the present invention to provide a linear actuator, which has a modular design, thereby reducing the volume, facilitating installation and providing good support.

To achieve this and other objects of the present invention, a linear actuator comprises a linear actuator comprises a linear module and a support module. The linear module comprises a base, a screw rod rotatably mounted in the base, and a transmission carriage threaded onto the screw rod and axially movable along the screw rod upon rotation of said screw rod. The support module comprises a first support carriage, a second support carriage, a protective cover, a first pulley block, a second pulley block, a cable, a first cable connection plate and a second cable connection plate. The first support carriage and the second support carriage are respectively mounted on and axially movable along the screw rod of the linear module, and disposed at two opposite sides relative to the transmission carriage. The protective cover is connected to the first support carriage and the second support carriage. The first pulley block and the second pulley block are respectively mounted on two opposite ends of the protective cover. The first pulley block comprises a first frame connected to the protective cover, and a first pulley mounted in the first frame. The second pulley block comprises a second frame connected to the protective cover, and a second pulley mounted in the second frame. The cable is wound round the first pulley and the second pulley. The first cable connection plate is connected between the transmission carriage of the linear module and a part of the cable. The second cable connection plate is connected between the base of the linear module and the two opposite ends of the cable.

Thus, when the transmission carriage starts moving, the first cable connection plate is driven to pull the cable, causing the cable to carry the protective cover via the first and second pulley blocks and then to further carry the first and second support carriages and the first and second pulley blocks, achieving the effect of supporting the screw rod.

From the above we can see that the linear actuator of the present invention utilizes a modular design to facilitate installation of the support module and the linear module. Further, subject to this modular design, the support module has a small volume and requires less installation pace, and therefore, it can be applied to any of various different sizes of linear modules.

Preferably, the protective cover comprises an end hole located at one end thereof; the first frame comprises an adjustment screw hole; the support module further comprises a tension adjustment screw inserted through the end hole of the protective cover and threaded into the adjustment screw hole of the first frame. Thus, when rotating the tension adjustment screw, the tension adjustment screw will drive the first frame to carry the first pulley, thereby adjusting the tension of the cable.

Preferably, the protective cover comprises an elongated slot located at one end thereof, and a through hole located at an opposite end thereof; the first frame comprises a first mounting hole; the second frame comprises a second mounting hole; the support module further comprises a first fastening member inserted through the elongated slot of the protective cover and fastened to the first mounting hole of the first frame to affix the first frame to the protective cover, and a second fastening member inserted through the through hole of the protective cover and fastened to the second mounting hole of the second frame to affix the second frame to the protective cover.

Preferably, the support module further comprises a first connection plate connected between the first support carriage and the one end of the protective cover, and a second connection plate connected between the second support carriage and the opposite end of the protective cover. Thus, the protective cover can be synchronously moved with the first and second support carriages.

Other advantages and features of the present invention will be fully understood by reference to the following specification in conjunction with the accompanying drawings, in which like reference signs denote like components of structure.

BRIEF DESCRIPTION OF THE DRAWINGS

FIG. 5 is a sectional side view of the linear actuator in accordance with the present invention, illustrating a status of the transmission carriage before movement.

FIG. 6 is similar to FIG. 5, illustrating the position of the transmission carriage changed.

DETAILED DESCRIPTION OF THE INVENTION

Figure 1:
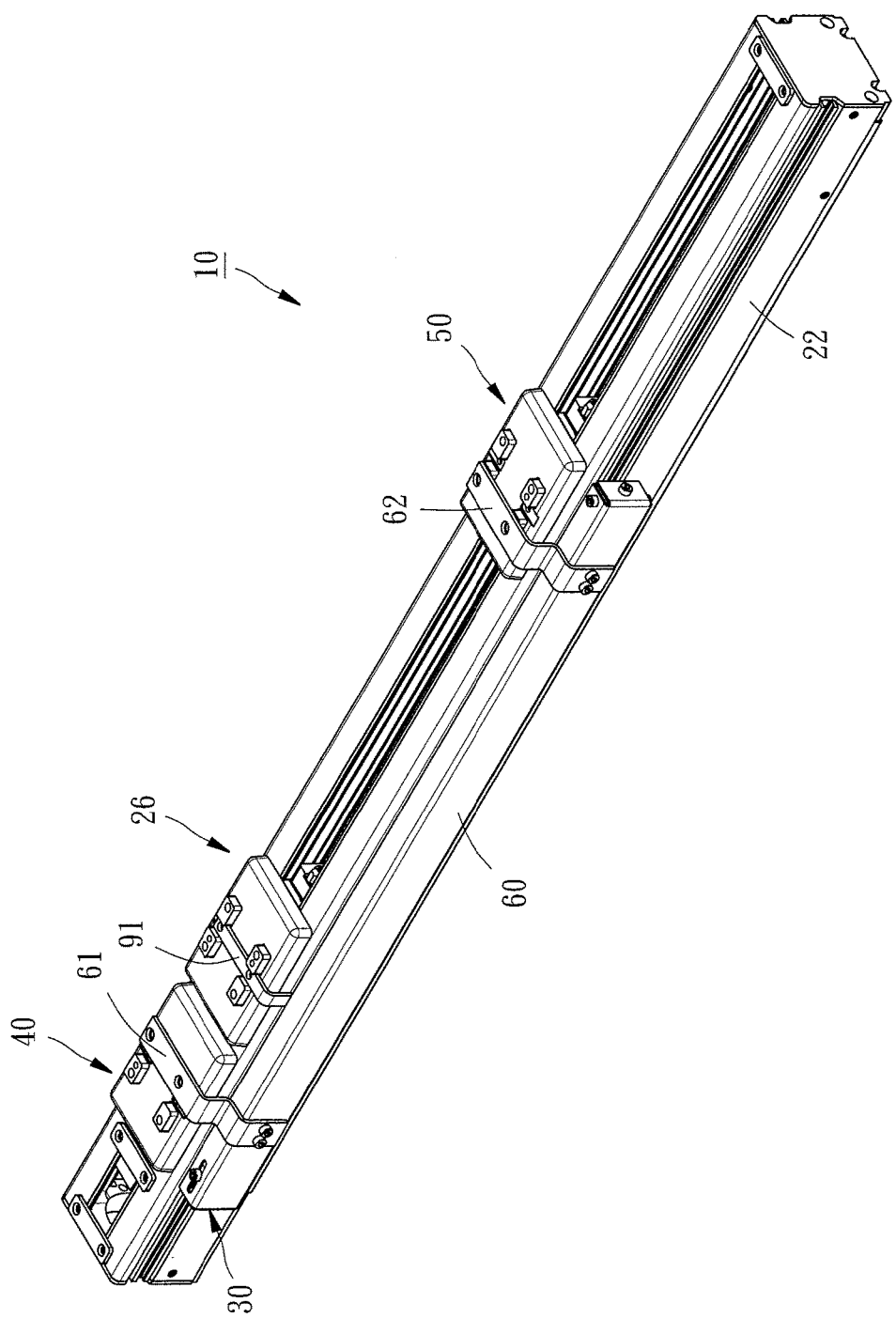
FIG. 1 is an oblique top elevational view of a linear actuator in accordance with a first embodiment of the present invention.

Referring to FIG. 1, a linear actuator 10 in accordance with the present invention is shown. The linear actuator 10 comprises a linear module 20, a support module 30.

The linear module 20 comprises a base 22, a screw rod 24 and a transmission carriage 26. The screw rod 24 is mounted in the base 22 and rotatable by a power drive (not shown). The transmission carriage 26 is threaded onto the screw rod 24 and drivable by the screw rod 24 to move relative to the base 22.

Figure 2:
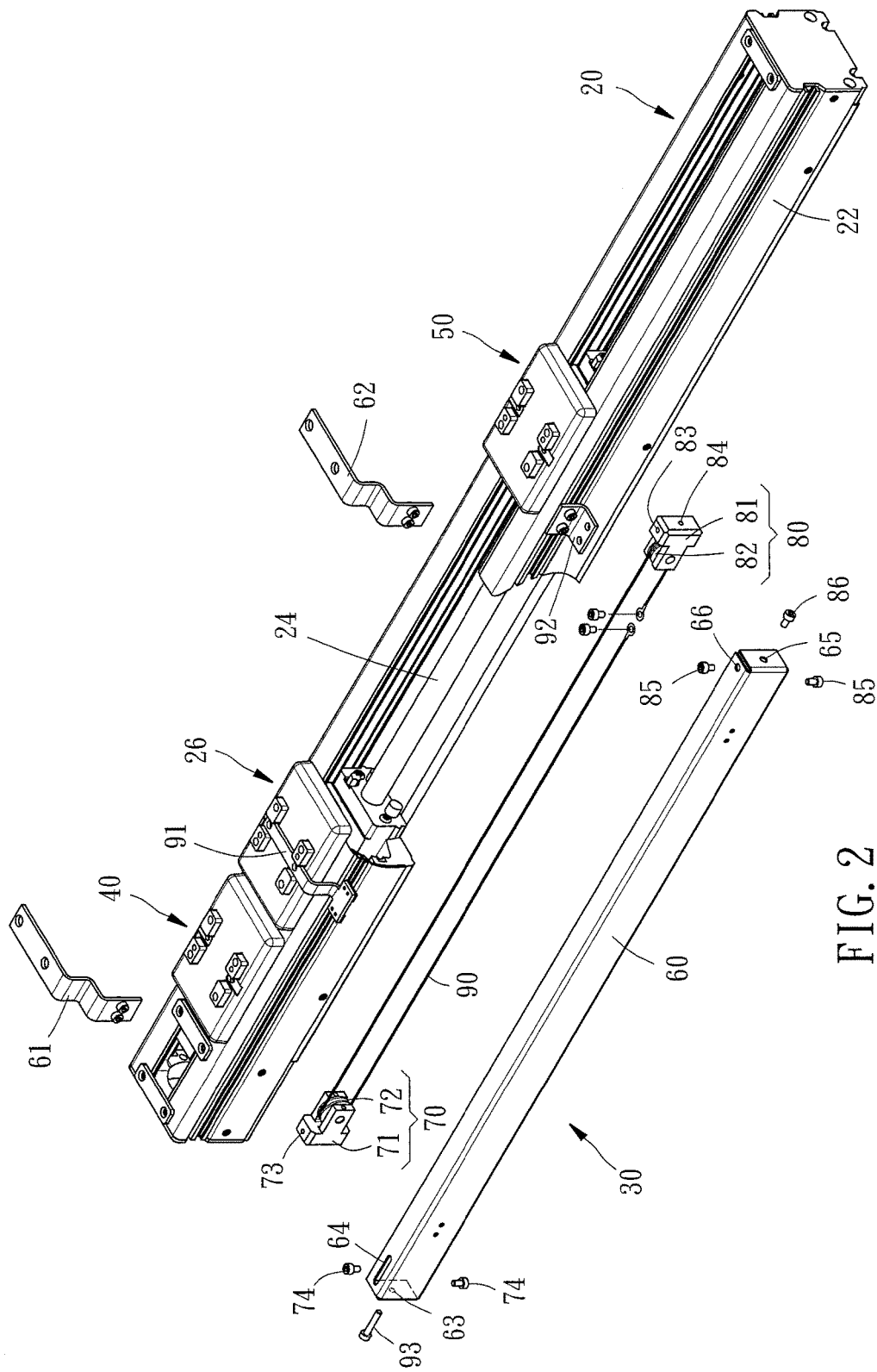
FIG. 2 is an exploded view of the linear actuator in accordance with a first embodiment of the present invention.

Referring to FIG. 2, the support module 30 comprises a first support carriage 40, a second support carriage 50, a protective cover 60, a first pulley block 70, a second pulley block 80, and a cable 90.

The first support carriage 40 and the second support carriage 50 are coupled to and axially movable along the screw rod 24, and disposed at two opposite sides relative to the transmission carriage 26.

The protective cover 60 in this embodiment is disposed outside the base 22 of the linear module 20, and connected to the first support carriage 40 and the second support carriage 50 by a first connection plate 61 and a second connection plate 62 respectively. Thus, the protective cover 60 is synchronously movable with the first support carriage 40 and the second support carriage 50. Further, the protective cover 60 comprises a first end hole 63 located on one end thereof corresponding to the first support carriage 40, two elongated slots 64 respectively located on opposing top and bottom walls of the one end corresponding to the first support carriage 40, a second end hole 65 located on an opposite end thereof corresponding to the second carriage 50, and two through holes 66 respectively located on opposing top and bottom walls of the opposite end corresponding to the second carriage 50.

Figure 3:
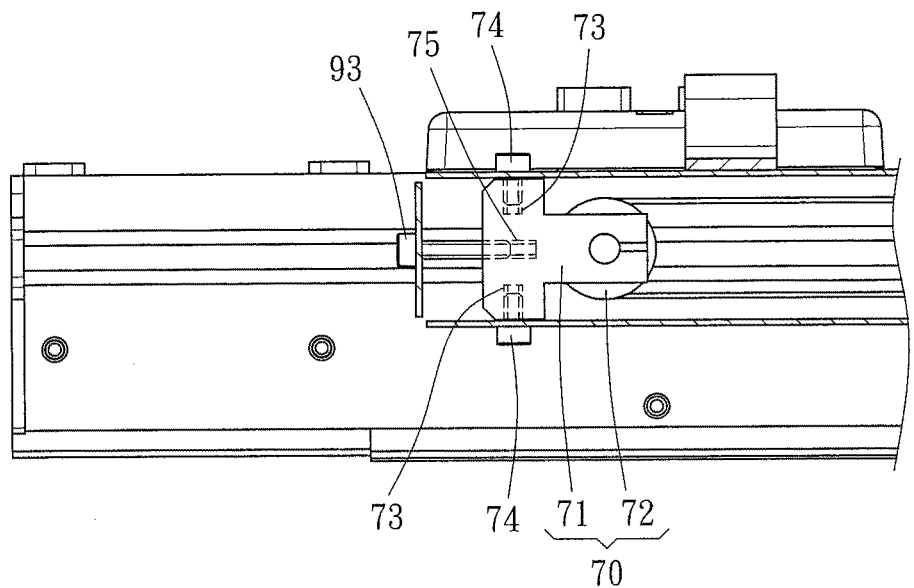
FIG. 3 is a sectional view, in an enlarged scale, of a part of the present invention, illustrating the relationship between the first pulley block and the protective cover.

The first pulley block 70 comprises a first frame 71, and a first pulley 72 mounted in the first frame 71. The first frame 71 is mounted in the protective cover 60, having two first mounting holes 73 respectively located on opposing top and bottom walls thereof. As illustrated in FIGS. 2 and 3, the first frame 71 is affixed to one end of the protective cover 60 with a first fastening member 74. The first fastening member 74 is inserted through the elongated slots 64 of the protective cover 60 and fastened to the first mounting holes 73 of the first frame 71.

Figure 4:
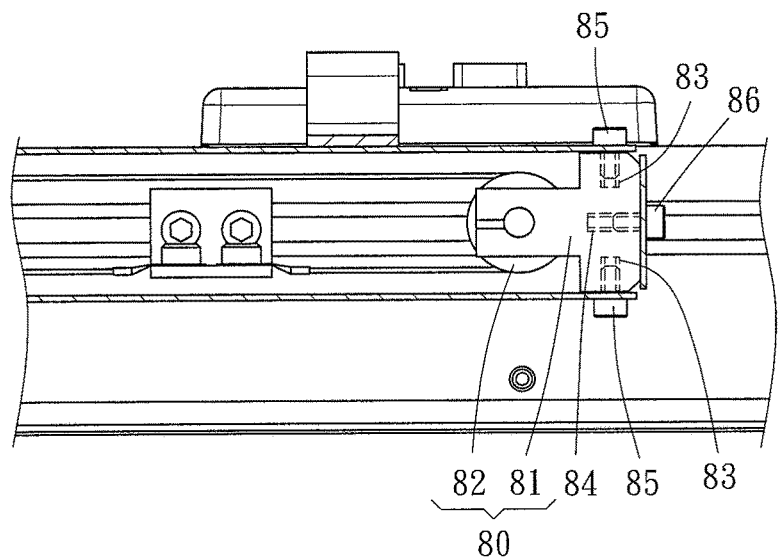
FIG. 4 is similar to FIG. 3, illustrating the relationship between the second pulley block and the protective cover.

The second pulley block 80 comprises a second frame 81, and a second pulley 82 mounted in the second frame 81. The second frame 81 is mounted in the protective cover 60, having two second mounting holes 83 respectively located on opposing top and bottom walls thereof and a third mounting hole 84 located on an end wall thereof opposite to the second pulley 82. As illustrated in FIGS. 2 and 4, the second frame 81 is affixed to the other end of the protective cover 60 with two second fastening members 85 and one third fastening member 86. The second fastening members 85 are respectively inserted through the through holes 66 of the protective cover 60 and fastened to the respective second mounting holes 83 of the second frame 81. The third fastening member 86 is inserted through the second end hole 65 of the protective cover 60 and fastened to the third mounting hole 84 of the second frame 81.

The cable 90 is wound round the first pulley 72 and the second pulley 82, having a part thereof fixedly connected to one end of a first cable connection plate 91 that has an opposite end thereof fixedly connected to the transmission carriage 26. The two opposite ends of the cable 90 are fixedly connected to one end of a second cable connection plate 92 that has an opposite end thereof fixedly connected to the outer peripheral wall of the base 22. Further, the first cable connection plate 91 is disposed above the elevation of the second cable connection plate 92.

Referring to FIGS. 5 and 6, when wishing to move the transmission carriage 26 from the left side of the base 22 toward the right side of the base 22, use the first cable connection plate 91 to pull the cable 90, causing the cable 90 to pull the first pulley 72, and thus, the first pulley block 70 can be moved with the cable 90. During movement of the first pulley block 70, the protective cover 60 is driven to carry the first and second support carriages 40, 50 and the second pulley block 80. On the contrary, when wishing to move the transmission carriage 26 from the right side of the base 22 toward the left side of the base 22, use the first cable connection plate 91 to pull the cable 90, causing the cable 90 to pull the second pulley 82, and thus, the second pulley block 80 can be moved with the cable 90. During movement of the second pulley block 80, the protective cover 60 is driven to carry the first and second support carriages 40, 50 and the first pulley block 70.

Thus, it can be seen from the above that the first and second support carriages 40, 50 can be moved synchronously through the protective cover 60 regardless of the direction in which the transmission carriage 26 is moved. On the use of movable pulley working principle, that is, the moving distance of the transmission carriage 26 is equal to twice the moving distance of the first and second support carriages 40, 50, the same distance can be maintained between the first and second support carriages 40, 50 during the movement of the transmission carriage 26, and thus, the effect of supporting the screw rod 24 is achieved.

On the other hand, as illustrated in FIG. 3, in order to maintain the optimal tension of the cable 90, the support module 30 further comprises a tension adjustment screw 93 and an adjustment screw hole 75 located on one end wall of the first frame 71 opposite to the first pulley 72. The tension adjustment screw 93 is inserted through the first end hole 63 of the protective cover 60 and threaded into the adjustment screw hole 75 of the first frame 71. Thus, when going to adjust the tension of the cable 90, loosen the two first fastening members 74, and then rotate the tension adjustment screw 93 to move the first frame 71 forward or backward, causing the first pulley 72 to pull tight or loosen the cable 90 during displacement of the first frame 71. At this time, the two first fastening members 74 are also moved forward or backward within the respective elongated slots 64 of the protective cover 60. When reached the expected appropriate state, fasten up the two first fastening members 74 to lock the first frame 71 in the adjusted position, and thus, the adjustment of the tension of the cable 90 is done.

Figure 7:
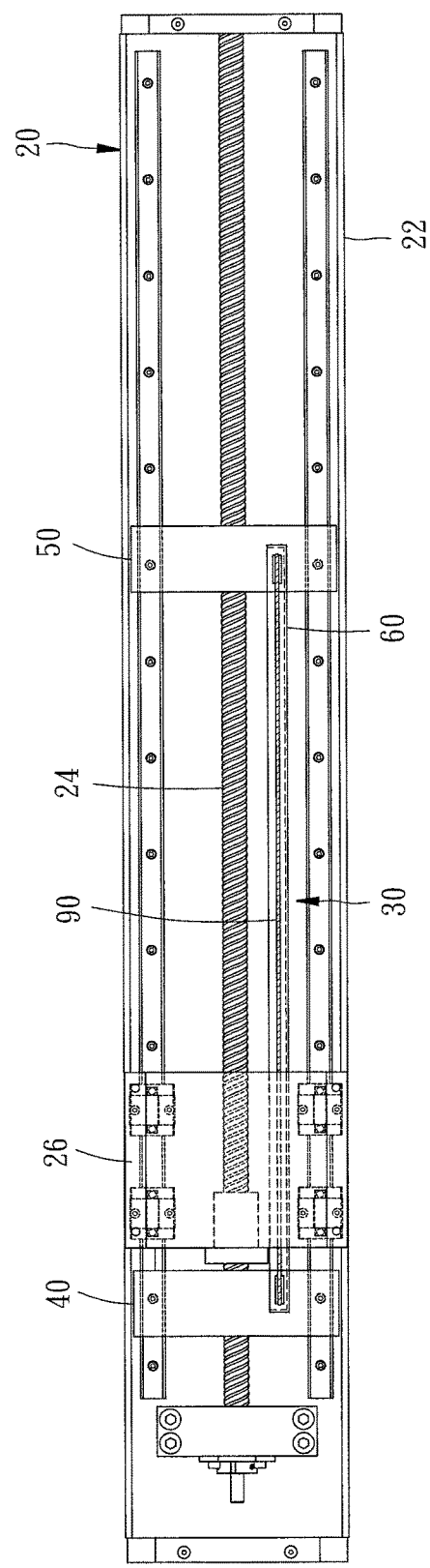
FIG. 7 is a schematic top view of an alternate form of the linear actuator in accordance with the present invention, illustrating the protective cover mounted in the base.

It's worth mentioning that, as illustrated in FIG. 7, the protective cover 60 can be mounted in the base 22 according to actual needs, enabling the support module 30 to be disposed inside the base 22 and the protective cover 60 to be connected to the first and second support carriages 40,50 for synchronous movement.

In conclusion, the linear actuator 10 of the present invention utilizes a modular design to allow the support module 30 to be easily mounted to the linear module 20 and to facilitate adjustment of the tension of the cable 90, and also utilizes the protective cover 60 to provide a protective effect to the cable 90. Further, subject to modular design, the support module 30 has a small volume and requires less installation pace, and therefore, it can be applied to any of various different sizes of linear modules 20.

What is claimed is:

1. A linear actuator, comprising:
 a linear module comprising a base, a screw rod rotatably mounted in said base and a transmission carriage threaded onto said screw rod and axially movable along said screw rod upon rotation of said screw rod; and
 a support module comprising a first support carriage, a second support carriage, a protective cover, a first pulley block, a second pulley block, a cable, a first cable connection plate and a second cable connection plate, said first support carriage and said second support carriage being respectively mounted on and axially movable along said screw rod of said linear module and disposed at two opposite sides relative to said transmission carriage, said protective cover being connected to said first support carriage and said second support carriage, said first pulley block and said second pulley block being respectively mounted on two opposite ends of said protective cover, said first pulley block comprising a first frame connected to said protective cover and a first pulley mounted in said first frame, said second pulley block comprising a second frame connected to said protective cover and a second pulley mounted in said second frame, said cable being wound around said first pulley and said second pulley, said first cable connection plate being connected between said transmission carriage of said linear module and a part of said cable, said second cable connection plate being connected between said base of said linear module and two opposite ends of said cable.

2. The linear actuator as claimed in claim 1, wherein said protective cover comprises an end hole located at one end thereof; said first frame comprises an adjustment screw hole; said support module further comprises a tension adjustment screw inserted through said end hole of said protective cover and threaded into said adjustment screw hole of said first frame.

3. The linear actuator as claimed in claim 1, wherein said protective cover comprises an elongated slot located at one end thereof and a through hole located at an opposite end thereof; said first frame comprises a first mounting hole; said second frame comprises a second mounting hole; said support module further comprises a first fastening member inserted through said elongated slot of said protective cover and fastened to said first mounting hole of said first frame, and a second fastening member inserted through said through hole of said protective cover and fastened to said second mounting hole of said second frame.

4. The linear actuator as claimed in claim 1, wherein said support module further comprises a first connection plate connected between said first support carriage and the one end of said protective cover, and a second connection plate connected between said second support carriage and the opposite end of said protective cover.

5. The linear actuator as claimed in claim 1, wherein said protective cover is disposed outside said base of said linear module.

6. The linear actuator as claimed in claim 1, wherein said protective cover is disposed inside said base of said linear module.

* * * * *